United States Patent
Moliterni

[11] 3,712,267
[45] Jan. 23, 1973

[54] BIRD FEEDER

[76] Inventor: Samuel S. Moliterni, 331 South Avenue, Garwood, N.J. 07087

[22] Filed: March 16, 1971

[21] Appl. No.: 124,813

[52] U.S. Cl. .................................................... 119/18
[51] Int. Cl. ........................................... A01k 39/00
[58] Field of Search ........................... 119/18, 17, 22

[56] References Cited

UNITED STATES PATENTS

| 264,293 | 9/1882 | Householder | 119/22 |
| 2,028,612 | 1/1936 | Kosvich | 119/17 |
| 2,031,874 | 2/1936 | Butler et al. | 119/18 |
| 3,415,226 | 12/1968 | Cheung | 119/18 |

*Primary Examiner*—Hugh R. Chamblee

[57] ABSTRACT

A feeder attachable to a bird cage and into which birds may enter for feeding, the device comprising a transparent plastic, long enclosure with an entrance doorway at one end and a removable food tray at the opposite end, so to prevent the food from being scattered upon the floor of the bird cage or outward from the cage.

2 Claims, 5 Drawing Figures

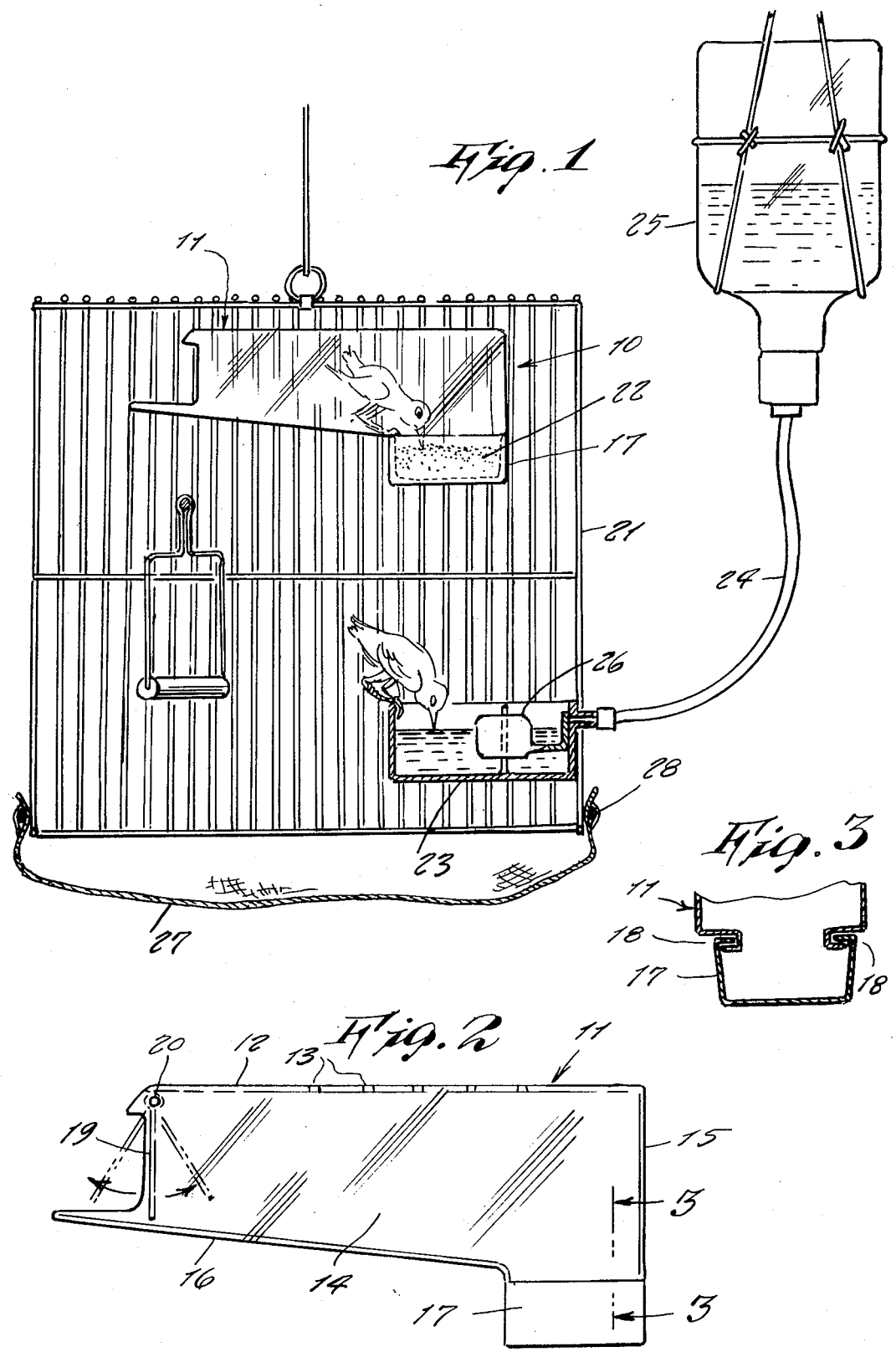

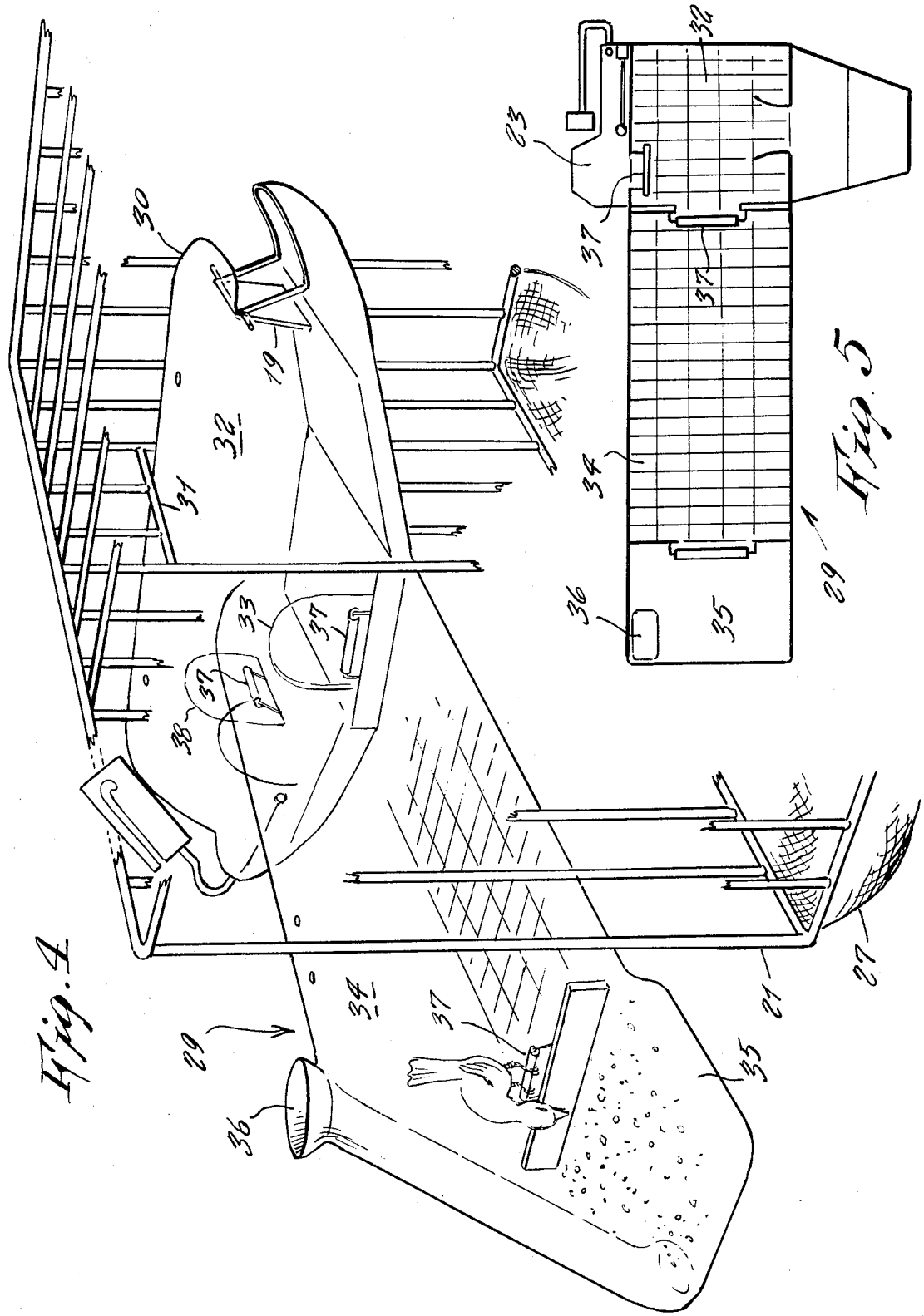

BIRD FEEDER

This invention relates generally to bird feeders, and more particularly to such as are used for birds held within a cage in a home.

It is generally well known to persons who keep pet birds in a cage at home, that the bird scatters the food outward of the feed tray, the food falling upon the floor of the cage or outward of the cage upon the floor of a room, so to cause a mess that must periodically be cleaned up. Such scattered food is wasted furthermore. This situation is therefore objectionable and in want of an improvement.

Accordingly, it is a principle object of the present invention to provide a bird feeder having means to prevent the bird food being scattered outward of a food tray so to eliminate the mess and waste of bird food.

Another object is to provide a bird feeder which may be made of transparent material so to allow a person the enjoying of watching the birds while feeding.

Another object is to provide a bird feeder which will provide the bird with food for a longer period of time so that a person need not refill the same as often and which allows a person to be away for a number of days or possibly weeks.

Other objects are to provide a BIRD FEEDER which is simple in design, inexpensive to manufacture, rugged in construction, easy to use and efficient in operation.

These and other objects will be readily evident upon a study of the following specification and the accompanying drawing wherein:

FIG. 1 is a cross sectional view of a bird cage and showing one form of the bird feeder for being placed within the cage.

FIG. 2 is a side view of the bird feeder.

FIG. 3 is a cross sectional view taken on line 3—3 of FIG. 2.

FIG. 4 is a perspective view of a modified design of bird feeder adaptable for securement on an outer side of the cage.

FIG. 5 is a top plan view thereof.

Referring now to the drawing in detail, and particularly at this time to FIGS. 1 to 3, the reference numeral 10 represents a BIRD FEEDER, according to the present invention, wherein there is an elongated enclosure 11 made of transparent molded plastic or glass material, and which includes a roof 12 with airvent openings 13 therethrough, opposite side walls 14, end wall 15 and inclined floor 16 which inclines downward toward a slidably removable food tray 17 supported under one end of the feeder enclosure 11 by a tongue and groove structures 18. A swinging door 19 is hung from a transverse pin 20 at the opposite end of the enclosure. The feeder can be hung from a hook within the cage 21 or supported therein by magnets or otherwise clipped thereto.

In operative use, as shown in FIG. 1, the feeder contains bird seed 22 in the tray 17. The bird pushes door 19 to enter the enclosure and then proceeds to the feed tray. The tray at the far end from the entrance door, as well as the presence of the depending door serve to prevent the seeds to scatter.

A separate water tray 23 for containing drinking water is supplied by a tube 24 from an inverted water jar 25 so to aid in also giving water to the birds for a long period of time in case a person is absent for a long while. A float 26 controls the water flow.

The cage may be bottomless type, the bottom thereof being closed by a disposable bag 27 secured by a peripheral elastic band 28 around the lower side of the cage. The bird waste drops in the bag which periodically can be replaced with minimum cleaning effort.

In FIGS. 4 and 5, a modified design of bird feeder 29 is designed for being placed on the outer side of the cage, the feeder having one end 30 fitted into an opening 31 in the cage so to permit birds to enter the feeder. This feeder may likewise be secured to the cage by any of various methods as above described.

In this form of the invention it is included an entry chamber 32 with the entry door at one end and a water tray 23, as above described at its opposite end. An entrance along an intermediate side of the chamber 32 communicates with one end of a sideward extending chamber 34 which at its opposite end has a food well 35 integrally formed therein. A seed funnel 36 formed in the housing serves to deliver seeds to the well 35. A perch 37 is suitably provided at the well 35, the entrance 33 and at an entrance 38 at the water tray for a bird to perch thereupon.

While various changes may be made in the detail construction, it is to be understood that such changes will be within the spirit and scope of the present invention.

I claim:

1. A bird feeder in combination with and mounted in a bird cage comprising a transparent enclosure having an entrance chamber at the front end and a feeding chamber at the rear end connected to and communicating with the entrance chamber via a transverse extension corridor aligned axially with said feeding chamber wherein said feeding chamber is remote from said entrance chamber and includes a depressed feeding well having a perch mounted at the end of the well adjacent the corridor including means preventing a bird from entering the well from beneath said perch, including a transverse wall separating the corridor from the entrance chamber, including an aperture through said wall to permit a bird to enter said corridor, including an external aperture communicating with said well for inserting bird food therein, and wherein said entrance chamber includes a lateral entrance extending outwardly and upwardly, said entrance having a pivoted closure biased to the closed position and a peripheral balcony thereabout serving as an external perch, wherein said well and second said aperture extend externally from the cage.

2. A feeder as in claim 1 including a water well in said entrance chamber opposite said entrance extension and protruding externally from said bird cage, said well including float means for controlling the flow of water into said well from an external source, said bird cage including a disposable bag secured to said cage about the cage bottom, said corridor and well being at an elevation below the entrance chamber.

* * * * *